United States Patent
Pursifull

(10) Patent No.: US 9,163,575 B2
(45) Date of Patent: Oct. 20, 2015

(54) METHODS AND SYSTEMS FOR AN OXYGEN SENSOR

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 13/849,402

(22) Filed: Mar. 22, 2013

(65) Prior Publication Data
US 2014/0288804 A1    Sep. 25, 2014

(51) Int. Cl.
*F02D 41/00* (2006.01)
*F02D 41/14* (2006.01)
*F02D 41/30* (2006.01)

(52) U.S. Cl.
CPC ........ *F02D 41/1454* (2013.01); *F02D 41/0032* (2013.01); *F02D 41/0052* (2013.01); *F02D 41/144* (2013.01); *F02D 41/1455* (2013.01); *F02D 41/1456* (2013.01); *F02D 41/3005* (2013.01); *F02D 41/1441* (2013.01); *Y02T 10/47* (2013.01)

(58) Field of Classification Search
CPC ............ F02D 41/1441; F02D 41/1454; F02D 41/1455; F02D 41/1456; F02D 41/0052; F02D 41/3005
USPC ................. 701/104, 101–103, 108, 109, 29.7; 123/516, 518–520, 568.11, 568.12
See application file for complete search history.

(56) References Cited

U.S. PATENT DOCUMENTS

| | | | | |
|---|---|---|---|---|
| 4,264,425 A | * | 4/1981 | Kimura et al. | 204/412 |
| 4,304,652 A | * | 12/1981 | Chiba et al. | 204/425 |
| 4,359,989 A | * | 11/1982 | Masaki et al. | 123/438 |
| 4,705,009 A | | 11/1987 | Asayama | |
| 5,363,091 A | | 11/1994 | Kotwicki et al. | |
| 5,365,216 A | | 11/1994 | Kotwicki et al. | |
| 6,254,750 B1 | | 7/2001 | Patrick et al. | |
| 6,371,086 B1 | * | 4/2002 | Matsubara et al. | 123/500 |
| 8,296,042 B2 | | 10/2012 | Xiao et al. | |
| 2002/0139360 A1 | * | 10/2002 | Sato et al. | 123/698 |
| 2012/0037134 A1 | * | 2/2012 | Jankovic et al. | 123/568.21 |
| 2013/0218438 A1 | | 8/2013 | Surnilla et al. | |

OTHER PUBLICATIONS

Surnilla, Gopichandra, et al., "Methods and Systems for a Gas Constituent Sensor," U.S. Appl. No. 13/706,074, filed Dec. 5, 2012, 23 pages.
Surnilla, Gopichandra, et al., "Ejector Flow Rate Computation for Gas Constituent Sensor Computation," U.S. Appl. No. 13/789,369, filed Mar. 7, 2013, 43 pages.
Surnilla, Gopichandra, et al., "Intake Air Oxygen Compensation for EGR," U.S. Appl. No. 13/789,182, filed Mar. 7, 2013, 32 pages.
"ECM OXY6200 Engine Oxygen Monitor," Engine Control and Monitoring, 2003, Los Altos, CA, 1 page.

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

Various systems and methods are described for an engine system with an exhaust gas recirculation system and catalyzing and non-catalyzing intake oxygen sensors. In one example, the catalyzing oxygen sensor is utilized to measure and control exhaust gas recirculation while fuel vapor purge is measured and controlled based on the catalyzing and non-catalyzing sensors.

20 Claims, 3 Drawing Sheets

METHODS AND SYSTEMS FOR AN OXYGEN SENSOR

TECHNICAL FIELD

The present application relates generally to a gas constituent sensor included in an intake system of an internal combustion engine.

BACKGROUND AND SUMMARY

Engine systems may utilize recirculation of exhaust gas from an engine exhaust system to an engine intake system (intake passage), a process referred to as exhaust gas recirculation (EGR), to reduce regulated emissions. An EGR system may include various sensors to measure and/or control the EGR. As one example, the EGR system may include an intake gas constituent sensor, such as an oxygen sensor, which may be employed to measure oxygen to determine the proportion of combusted gases in an intake passage of the engine. Further, the sensor is sensitive to total pressure. As such, the sensor may be sensitive to diluents such as ambient humidity, exhaust humidity, and carbon dioxide. Due to equilibration of the sensed gas by a catalyzing sensing element of the sensor, the oxygen sensor is sensitive to both the partial pressure of oxygen and the presence of fuel (or other reductants and oxidants). As such, the sensor may be sensitive to oxidants and reductants such as oil mist and fuel vapor. Thus, the sensor measurements may be confounded by the various sensitivities, and the accuracy of the sensor, and thus, measurement and/or control of EGR, may be reduced.

The inventor herein has recognized the above issue and have devised an approach to at least partially address it. Thus, a method for an engine system is disclosed. The method includes, based on outputs from a catalyzing sensor and a non-catalyzing sensor, indicating an intake oxygen concentration and a fuel vapor concentration. The method further includes adjusting EGR responsive to the oxygen concentration, and adjusting fuel injection responsive to the fuel vapor concentration.

In such an example, the non-catalyzing sensor is used to determine an amount of EGR and the difference between the catalyzing sensor output and the non-catalyzing sensor output is used to determine an amount of fuel vapor. By using a non-catalyzing sensor, equilibration at a sensing surface of the sensor is reduced such that fuel vapor acts as a diluent instead of directly reducing the measured oxidant level. As such, EGR may be measured and controlled with increased accuracy. Further, a difference in output between the catalyzing sensor and the non-catalyzing sensor may be indicative of the fuel vapor concentration. In this way, an operating parameter such as fuel injection may be adjusted responsive to the fuel vapor concentration in the intake passage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to methods and systems for an engine system with an exhaust gas recirculation (EGR) system and catalyzing and non-catalyzing intake gas constituent sensors, such as an oxygen sensor. In one example, a method comprises, based on outputs from a catalyzing sensor and a non-catalyzing sensor, indicating an intake oxygen concentration and a fuel vapor concentration. The method further comprises adjusting EGR responsive to the oxygen concentration, and adjusting fuel injection and/or fuel vapor purge responsive to the fuel vapor concentration. In such an example, the non-catalyzing sensor output may be indicative of the oxygen concentration while a difference between the catalyzing sensor and non-catalyzing sensor output is indicative of the fuel vapor concentration. As such, a measurement of EGR may be obtained which is not affected by fuel vapor present in the intake passage of the engine. Thus, EGR may be controlled with increased accuracy and fuel vapor purge and/or fuel injection may be adjusted based on the measured fuel vapor concentration.

Figure 1:
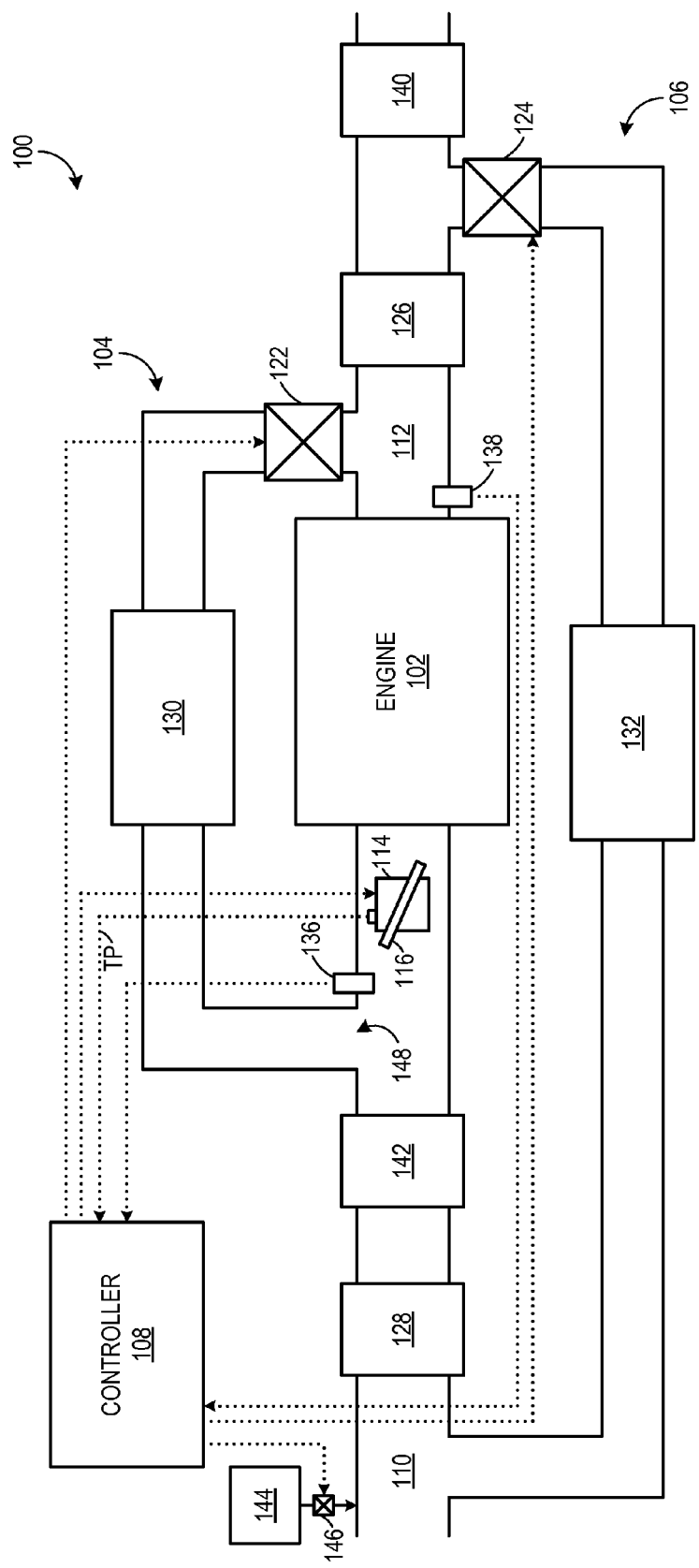
FIG. 1 shows a schematic diagram of an engine including an exhaust gas recirculation system and a dual element oxygen sensor.

Referring now to FIG. 1, is a schematic diagram of an engine system 101 with an engine 102, which may be included in a propulsion system of an automobile, is shown. As depicted, the engine system 100 includes an exhaust gas recirculation system including a high pressure EGR system 104 and a low pressure EGR system 106. The engine system 100 may be controlled at least partially by a control system including a controller 108.

The engine 102 may include a plurality of cylinders (not shown) configured to combust a mixture of charge air (e.g., intake air) and fuel, such as diesel, gasoline, alcohol (e.g., ethanol, methanol, etc.), a fuel blend, or another suitable fuel. The charge air may be delivered to the engine 102 via an intake passage 110, and the engine 102 may exhaust combustion gases via an exhaust passage 112.

The intake passage 110 may include one or more throttles, such as a throttle 114 having a throttle plate 116. In this particular example, a position of the throttle plate 116 may be varied by the controller 108 via signals provided to an electric motor or actuator included with the throttle 114, a configuration that is commonly referred to as electronic throttle control (ETC). In this manner, the throttle 114 may be operated to vary the intake air provided to the engine cylinders. The position of the throttle plate 116 may be provided to the controller 108 by throttle position signals TP. In the example depicted in FIG. 1, the intake passage 110 further includes an intake gas constituent sensor 136, such as an oxygen sensor configured to provide an indication of oxygen concentration, or amount of EGR) upstream of the throttle 114. As will be described in greater detail below, the intake gas constituent sensor 136 may be a dual element sensor having a non-catalyzing sensor and a catalyzing sensor. The intake passage 110 may further include a mass air flow sensor (not shown) and a manifold air pressure sensor (not shown) for providing respective signals MAF and MAP to the controller 108.

In the disclosed embodiments, the EGR system routes a desired portion of exhaust gas from the exhaust passage 112 to the intake passage 110 via the high pressure EGR system 104 and/or the low pressure EGR system 106, depending on desired amounts of HP EGR and LP EGR. The high pressure EGR is routed from upstream of a turbine 126 of a turbocharger in the exhaust passage 112 to downstream of a compressor 128 of the turbocharger in the intake passage 110 via a high pressure EGR passage 118. The low pressure EGR is routed from downstream of the turbine 126 of the turbocharger to upstream of the compressor 128 of the turbocharger via a low pressure EGR passage 120. The amount of EGR provided to the intake passage 110 may be varied by the controller 108 via a high pressure EGR valve 122 coupled in the high pressure EGR system 104 and a low pressure EGR valve 124 coupled in the low pressure EGR system 106. In some embodiments, a throttle may be included in the exhaust to assist in driving the EGR, for example. Further, in the example embodiment shown in FIG. 1, the high pressure EGR system includes a high pressure EGR cooler 130 and the low pressure EGR system includes a low pressure EGR cooler 132 to reject heat from the recirculated exhaust gas to engine coolant, for example. In alternative embodiments, the engine 102 may include only a high pressure EGR system or only a low pressure EGR system.

The total amount of EGR and/or a high pressure EGR to low pressure EGR ratio may be measured and/or controlled based on an exhaust gas constituent sensor 138 (e.g., an exhaust gas oxygen sensor) and/or the intake gas constituent sensor 136 (e.g., an intake oxygen sensor). The exhaust gas constituent sensor 138 is shown coupled to the exhaust passage 112 upstream of the turbine 126 and the intake gas constituent sensor 136 is shown coupled to the intake passage 110 downstream of a high pressure EGR inlet 148. The exhaust gas constituent sensors 136 and 138 may be any suitable sensors for providing an indication of exhaust or intake gas air/fuel ratio such as a linear oxygen sensor or UEGO (universal or wide-range exhaust gas oxygen), a two-state oxygen sensor or EGO, a HEGO (heated EGO), a $NO_X$, HC, or CO sensor. In the example embodiments described below with reference to FIGS. 2-3, the intake gas constituent sensor is a dual element oxygen (e.g., $O_2$) sensor, for example. The intake gas constituent sensor 136 may be used to determine an intake oxygen concentration for EGR measurement and/or control and to determine a fuel vapor concentration for fuel vapor purge and/or fuel injection control, for example.

As stated above, the engine system 100 further includes a turbocharger with the turbine 126 arranged along the exhaust passage 112 and the compressor 128 arranged along the intake passage 110. For example, the compressor 128 may be at least partially driven by the turbine 126 (e.g., via a shaft). In this example, the amount of compression (e.g., boost) provided to one or more cylinders of the engine via the turbocharger may be varied by controller 108.

Further, in the example of FIG. 1, an emission control device 140 is shown arranged along the exhaust passage 112 downstream of the turbine 126 and the low pressure EGR passage 120. The emission control device 140 may be a selective catalytic reduction (SCR) system, three way catalyst (TWC), $NO_X$ trap, various other emission control devices, or combinations thereof. Further, in some embodiments, during operation of the engine 102, the emission control device 140 may be periodically reset by operating at least one cylinder of the engine within a particular air/fuel ratio, for example.

The engine system 100 further includes charge air cooler (CAC) 142. The CAC 142 is arranged along the intake passage 110 downstream of the compressor 128 for cooling the engine intake air after it has passed through the turbocharger and/or if it is diluted with low pressure EGR, for example.

Further, the engine system 100 includes a fuel vapor canister 144 which may be filled with adsorbent to temporarily trap fuel vapors (including vaporized hydrocarbons) during fuel tank refilling operations and "running loss" (that is, fuel vaporized during vehicle operation). In one example, the adsorbent used is activated charcoal. The controller 108 may be configured to adjust a fuel vapor purge valve 146 to control a flow of fuel vapors from the fuel vapor canister 144 to the intake passage 110, for example. As will be described in greater detail below, when the intake gas constituent sensor 136 is a dual element sensor which includes a catalyzing sensor and a non-catalyzing sensor or when separate catalyzing and non-catalyzing sensors are used, the sensors may be employed to determine an amount of fuel vapor based on a difference between output from the catalyzing sensor and the non-catalyzing sensor.

The controller 108 may be a microcomputer including the following, although not shown in FIG. 1: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example control routines are described herein with regard to FIG. 4.

Figure 2:
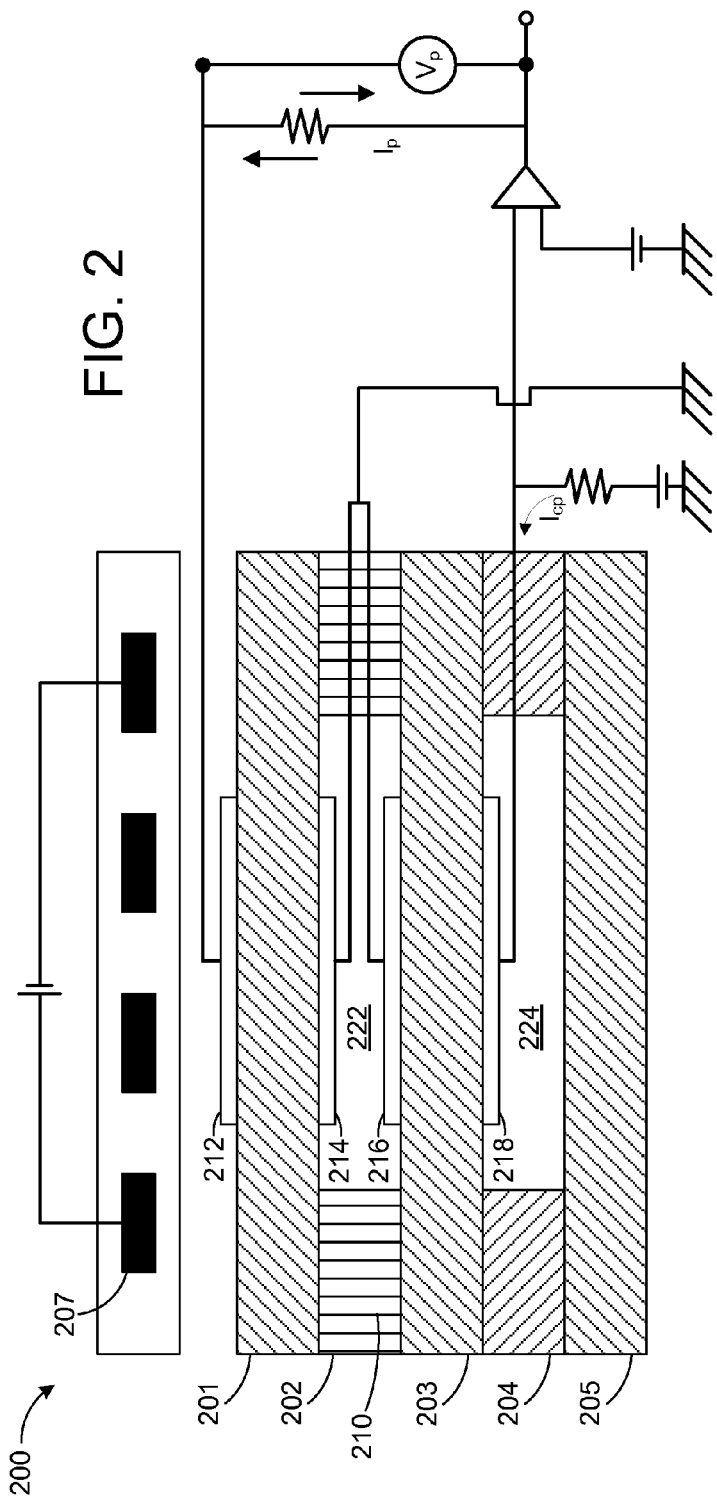
FIG. 2 shows an example embodiment of an intake gas constituent sensor.

FIG. 2 shows a schematic view of an example embodiment of an oxygen sensor 200 configured to measure a concentration of oxygen ($O_2$) in an intake gas stream. The sensor 200 may operate as the intake gas constituent sensor 136 of FIG. 1, for example. The sensor 200 comprises a plurality of layers of one or more ceramic materials arranged in a stacked configuration. In the embodiment of FIG. 2, five ceramic layers are depicted as layers 201, 202, 203, 204, and 205. These layers include one or more layers of a solid electrolyte capable of conducting ionic oxygen. Examples of suitable solid electrolytes include, but are not limited to, zirconium oxide-based materials. Further, in some embodiments, a heater 207 may be disposed in thermal communication with the layers to increase the ionic conductivity of the layers. While the depicted oxygen sensor is formed from five ceramic layers, it will be appreciated that the oxygen sensor may include other suitable numbers of ceramic layers.

The layer 202 includes a material or materials creating a diffusion path 210. The diffusion path 210 is configured to introduce intake gases into a first internal cavity 222 via diffusion. The diffusion path 210 may be configured to allow one or more components of intake gases, including but not limited to a desired analyte (e.g., $O_2$), to diffuse into the internal cavity 222 at a more limiting rate than the analyte can be pumped in or out by a pumping electrodes pair 212 and 214. In this manner, a stoichiometric level of $O_2$ may be obtained in the first internal cavity 222.

The sensor 200 further includes a second internal cavity 224 within the layer 204 separated from the first internal cavity 222 by the layer 203. The second internal cavity 224 is configured to maintain a constant oxygen partial pressure equivalent to a stoichiometric condition, e.g., an oxygen level present in the second internal cavity 224 is equal to that which the exhaust gas would have if the air-fuel ratio was stoichiometric. The oxygen concentration in the second internal cavity 224 is held constant by pumping current $I_{cp}$. Herein, second internal cavity 224 may be referred to as a reference cell.

A pair of sensing electrodes 216 and 218 is disposed in communication with first internal cavity 222 and reference cell 224. The sensing electrodes pair 216 and 218 detects a concentration gradient that may develop between the first internal cavity 222 and the reference cell 224 due to an oxygen concentration in the exhaust gas that is higher than or lower than the stoichiometric level. A high oxygen concentration may be caused by a lean exhaust gas mixture, while a low oxygen concentration may be caused by a rich mixture.

A pair of pumping electrodes 212 and 214 is disposed in communication with internal cavity 222, and is configured to electrochemically pump a selected gas constituent (e.g., $O_2$) from internal cavity 222 through layer 201 and out of sensor 200. Alternatively, the pair of pumping electrodes 212 and 214 may be configured to electrochemically pump a selected gas through layer 201 and into internal cavity 222. Herein, pumping electrodes pair 212 and 214 may be referred to as an $O_2$ pumping cell.

Electrodes 212, 214, 216, and 218 may be made of various suitable materials. In some embodiments, electrodes 212, 214, 216, and 218 may be at least partially made of a material that catalyzes the dissociation of molecular oxygen. In the case of a catalyzing sensor, examples of such materials include, but are not limited to, electrodes containing platinum and/or gold. In the case of a non-catalyzing sensor, at least the sensing electrodes may be coated with a different metal, such as silver or lead such that they are low to non-catalytic.

The process of electrochemically pumping the oxygen out of or into internal cavity 222 includes applying an electric current $I_p$ across pumping electrodes pair 212 and 214. The pumping current $I_p$ applied to the $O_2$ pumping cell pumps oxygen into or out of first internal cavity 222 in order to maintain a stoichiometric level of oxygen in the cavity pumping cell. The pumping current $I_p$ is proportional to the concentration of oxygen in the intake gas. Thus, a lean mixture will cause oxygen to be pumped out of internal cavity 222 and a rich mixture will cause oxygen to be pumped into internal cavity 222.

A control system (not shown in FIG. 2) generates the pumping voltage signal $V_p$ as a function of the intensity of the pumping current $I_p$ required to maintain a stoichiometric level within the first internal cavity 222.

Figure 3:
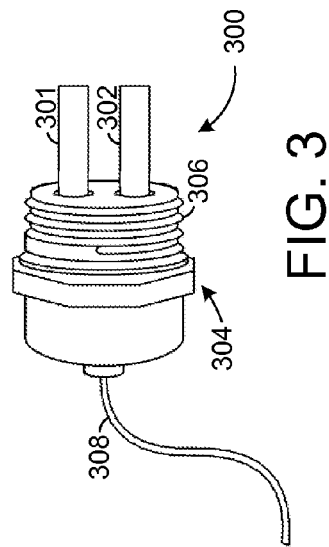
FIG. 3 shows a schematic diagram of a dual element oxygen sensor.

Continuing to FIG. 3, an example embodiment of a dual element oxygen sensor 300 is shown. The oxygen sensor 300 may be positioned in an intake system such as sensor 136 described above with reference to FIG. 1, for example. The sensor 300 may be any suitable sensor for providing an indication of a gas concentration, such as oxygen, in an intake manifold as described above with reference to FIG. 1. For example, the sensor 300 may be a linear oxygen sensor, a UEGO sensor, etc. Further, the sensor 300 may be a heated sensor.

As shown in FIG. 3, the sensor 300 includes a body portion 304 with a threaded portion 306 for engagement with a suitably threaded aperture in an intake manifold or exhaust passage of an engine. The body portion 304 may be made of steel, for example. Further, a cord 308 extends from the body portion 304. The cord 308 contains wires (not shown) for electrical connection to a control unit that enable sensor to be used in a feedback fuel control system, for example.

In this example, the sensor 300 is depicted holding two sensing elements 301 and 302 which extend outwardly from the body portion 304 in the opposite direction of the cord 308, as shown in FIG. 3. When installed such as in the example of FIG. 1, the sensing elements 301 and 302 extend into the intake manifold past a wall (e.g., inner surface) of the intake manifold.

The sensing elements 301 and 302 may be responsive to the partial pressure of oxygen in the gas flow through an engine and may be made of a ceramic metal oxide such as a zirconium oxide based material, for example, as described above. Further, the sensing elements 301 and 302 may include a heating element for heating the sensor in order to lower the impedance of the metal oxide and minimize deposits which may degrade the sensor while the sensor is in operation, for example. As an example, the sensing element 301 may be part of a catalyzing sensor and the sensing element 302 may be part of a non-catalyzing sensor. By including a catalyzing sensor and a non-catalyzing sensor, a more accurate measurement of EGR may be obtained, as an effect of diluents such as fuel vapor on the measurement is reduced. Further, under some conditions, a difference between the outputs of the sensors may indicate a concentration of fuel vapor in the intake, as will be described in greater detail below.

It should be understood, the oxygen sensor shown in FIGS. 2 and 3 is only one example of an oxygen sensor, and that other embodiments of oxygen sensors may have additional and/or alternative features and/or designs. As another non-limiting example, the engine system may include two intake gas constituent sensors, one of the sensors having a catalyzing sensing element and the other sensor having a non-catalyzing sensing element.

Figure 4:
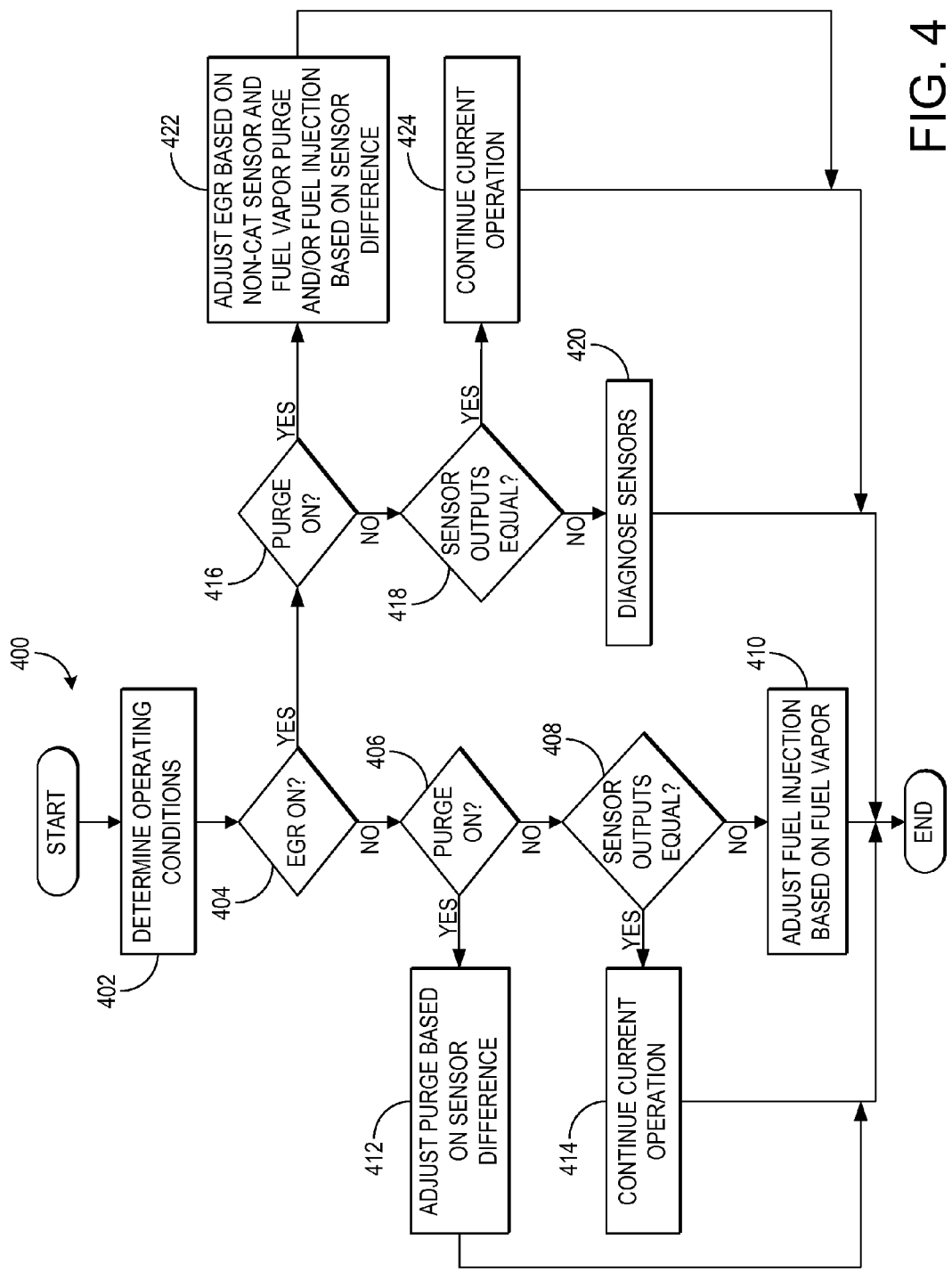
FIG. 4 shows a flow chart illustrating a routine for an engine system with a dual element oxygen sensor.

FIG. 4 shows a flow chart illustrating a routine for an engine system with a dual element (e.g., catalyzing and non-catalyzing) oxygen sensor, such as the engine system 101 described above with reference to FIG. 1. Specifically, the routine determines an operating state of EGR and fuel vapor purge (e.g., on or off), and adjusts one or more operating parameters based on output of the catalyzing and non-catalyzing oxygen sensors. In some examples, the catalyzing and non-catalyzing oxygen sensors may be two separate sensors positioned in the intake passage of the engine.

At 402, operating conditions are determined. As non-limiting examples, the operating conditions may include ambient temperature and pressure, boost, air fuel ratio, etc.

Once the operating conditions are determined, the routine continues to 404 where it is determined if EGR is on. It may be determined that EGR is on if one or both of the high pressure and low pressure EGR valves is positioned such that exhaust gas flows from the exhaust passage to the intake passage, for example.

If it is determined that EGR is not on, the routine proceeds to 406 where it is determined if fuel vapor purge is on. It may be determined that fuel vapor purge is on based on a position of the fuel vapor purge valve. For example, it may be determined that fuel vapor purge is on if the fuel vapor purge valve is positioned such that fuel vapors are flowing from the fuel vapor canister to the intake passage.

If it determined that fuel vapor purge is not on, the routine continues to 408 where it is determined if outputs from the catalyzing sensor and the non-catalyzing sensor are substantially equal. If the outputs are not substantially equal, that indicates the presence of fuel vapor (or any reductant). Thus, if it is determined that the sensor outputs are not equal, the routine proceeds to 410 where output from the catalyzing sensor indicates a fuel vapor concentration, such as positive crankcase ventilation (PCV), in the intake passage, and fuel injection may be adjusted based on the indication of fuel vapor. On the other hand, if it is determined that the sensor outputs are equal, the routine moves to 414 where current operation is continued.

Turning back to 406, if it is determined that fuel vapor purge is on, the routine moves to 412 where fuel vapor is detected by the catalyzing sensor and fuel vapor purge is adjusted based on a difference in output between the catalyzing sensor and the non-catalyzing sensor. In some examples, fuel injection may additionally or alternatively be adjusted responsive to the outputs of the catalyzing and non-catalyzing sensors. As an example, fuel injection may be reduced if the fuel vapor purge is greater than a threshold concentration.

Turning back to 404, if it is determined that EGR is on, the routine moves to 416 where it is determined if fuel vapor purge is on. As described above, it may be determined that fuel vapor purge is on if the fuel vapor purge valve is positioned such that fuel vapors are flowing from the fuel vapor canister to the intake passage, for example.

If it is determined that fuel vapor purge is not on, the routine continues to 418 where it is determined if the output from the catalyzing sensor and the non-catalyzing sensor are substantially equal. For example, when EGR is on and fuel vapor purge is off, the sensors should each measure a concentration of oxygen in the intake air due to EGR, as fuel vapor purge is not on and should not affect the EGR measurement of the catalyzing sensor. (This assumes that the exhaust gas is controlled to stoichiometry which is the predominant situation.) If it is determined that the sensor outputs are substantially equal, the routine moves to 424 and current operation is continued.

On the other hand, if it is determined that the sensor outputs are not equal, the routine proceeds to 420 where the sensors are diagnosed. For example, the catalyzing sensor may be diagnosed based on the non-catalyzing sensor or the non-catalyzing sensor may be diagnosed based on the catalyzing sensor.

Turning back to 416, if it is determined that fuel vapor purge is on, the routine moves to 422 where EGR is measured and controlled based on the non-catalyzing sensor and fuel vapor concentration is measured based on a difference between the catalyzing sensor and the non-catalyzing sensor. For example, based on the measured concentration of oxygen in the intake gas, the amount of EGR may be increased or reduced responsive to the oxygen concentration. Further, at least one of fuel vapor purge and fuel injection may be adjusted based on the fuel vapor concentration. As an example, fuel injection may be reduced if the fuel vapor purge is greater than a threshold concentration, or vice versa.

Thus, one or more of EGR, fuel vapor purge, and fuel injection may be adjusted responsive to output from a dual element oxygen sensor positioned in an intake passage of an engine, the sensor including catalyzing and non-catalyzing elements. Because equilibration is reduced at the non-catalyzing sensor, EGR may be measured and controlled with increased accuracy. Further, because both catalyzing and non-catalyzing elements are included, fuel vapor concentration may also be measured and used to adjust operating parameters.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an engine system, comprising:
 based on a first output from a catalyzing sensor and a second output of a non-catalyzing sensor, determining an intake oxygen concentration and a fuel vapor concentration;
 adjusting exhaust gas recirculation responsive to the determined oxygen concentration; and
 adjusting fuel injection responsive to the determined fuel vapor concentration.

2. The method of claim 1, wherein a sensing element including a first sensing electrode of the catalyzing sensor is coated with platinum.

3. The method of claim 1, wherein a sensing element including a second sensing electrode of the non-catalyzing sensor is coated with silver.

4. The method of claim 1, wherein the oxygen concentration is based on the second output from the non-catalyzing sensor.

5. The method of claim 1, wherein the fuel vapor concentration is based on the first output from the catalyzing sensor and the second output from the non-catalyzing sensor.

6. The method of claim 1, wherein the fuel vapor concentration is based on a difference between the first output of the catalyzing sensor and the second output of the non-catalyzing sensor when fuel vapor purge is on and exhaust gas recirculation is on.

7. The method of claim 1, further comprising diagnosing the sensors when fuel vapor purge is off and exhaust gas recirculation is on and based on a difference between the first and second outputs.

8. The method of claim 1, wherein the catalyzing sensor and the non-catalyzing sensor are positioned in a single sensor housing, where each of the catalyzing sensor and the non-catalyzing sensor include a sensing electrode.

9. The method of claim 1, wherein the fuel vapor concentration is based on a difference between the outputs of the catalyzing sensor and the non-catalyzing sensor when fuel vapor purge is on and exhaust gas recirculation is off and wherein adjusting fuel injection responsive to the determined fuel vapor concentration includes reducing fuel injection if the determined fuel vapor concentration is greater than a threshold concentration.

10. The method of claim 1, wherein the catalyzing sensor and the non-catalyzing sensor are positioned in an intake manifold of the engine system, downstream of an exhaust gas recirculation inlet and wherein the first output is a first pumping current and the second output is a second pumping current.

11. A method, comprising:
controlling fuel vapor purge based on a first output from a catalyzing oxygen sensor and a second output from a non-catalyzing oxygen sensor, the catalyzing sensor and the non-catalyzing sensor housed in a single sensor housing positioned in an engine intake system; and
controlling exhaust gas recirculation based on the second output from the non-catalyzing oxygen sensor.

12. The method of claim 11, wherein the catalyzing sensor includes a first sensing element coated with platinum and the non-catalyzing sensor includes a second sensing element coated with silver, where the first sensing element is different than the second sensing element.

13. The method of claim 11, further comprising, while fuel vapor purge is off and exhaust gas recirculation is on, diagnosing the catalyzing sensor based on the non-catalyzing sensor responsive to the first and second outputs not being equal.

14. The method of claim 11, further comprising, while fuel vapor purge is off and exhaust gas recirculation is on, diagnosing the non-catalyzing sensor based on the catalyzing sensor responsive to the first and second outputs not being equal.

15. The method of claim 11, further comprising controlling fuel injection based on the first and second outputs when fuel vapor purge is on.

16. The method of claim 15, wherein controlling fuel injection based on the first and second outputs includes controlling fuel injection responsive to an indication of fuel vapor purge based on a difference between the first output and the second output.

17. The method of claim 11, wherein controlling fuel vapor purge based on the first output from the catalyzing oxygen sensor and the second output from the non-catalyzing oxygen sensor includes controlling fuel vapor purge based on a difference between the first and second outputs.

18. A system, comprising:
an engine with an intake passage and an exhaust passage;
an exhaust gas recirculation system coupled between the intake passage and the exhaust passage;
a non-catalyzing oxygen sensor positioned in the intake passage and configured to output a first output indicative of an oxygen concentration;
a catalyzing oxygen sensor positioned in the intake passage and configured to output a second output, where a difference between the second output and first output is indicative of a fuel vapor concentration; and
a control system in communication with the sensors, the control system including non-transitory instructions to adjust an amount of exhaust gas recirculation based on the first output and adjust one or more of fuel vapor purge and fuel injection based on the difference between the second output and first output.

19. The system of claim 18, wherein the non-catalyzing oxygen sensor includes a sensing electrode coated with a non-catalyzing material and the catalyzing oxygen sensor includes a sensing electrode coated with a catalyzing material and wherein the non-catalyzing oxygen sensor and the catalyzing oxygen sensor are two separate sensors positioned in the intake passage.

20. The system of claim 18, further comprising instructions for diagnosing the sensors when exhaust gas recirculation is on and fuel vapor purge is off and responsive to the second output and the first output not being equal.

* * * * *